Figure 1:
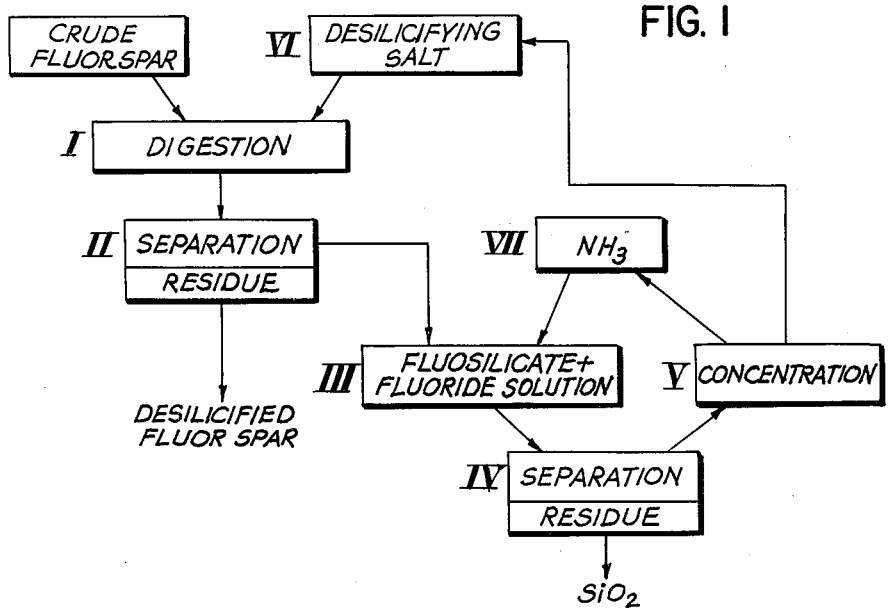

Oct. 24, 1961    HANS-JOACHIM RIEDL ET AL    3,005,685
PROCESS FOR DESILICIFYING FLUORSPAR AND THE LIKE MINERALS
Filed Aug. 19, 1958

INVENTORS
HANS-JOACHIM RIEDL
JOHANNES DAHMLOS
BY Toulmin & Toulmin
ATTORNEYS 3,005,685
PROCESS FOR DESILICIFYING FLUORSPAR
AND THE LIKE MINERALS
Hans-Joachim Riedl, Recklinghausen, and Johannes
Dahmlos, Haltern, Germany, assignors to Wasag-
Chemie Aktiengesellschaft, Essen, Germany
Filed Aug. 19, 1958, Ser. No. 756,011
Claims priority, application Germany Aug. 28, 1957
5 Claims. (Cl. 23—88)

This invention relates to a process for desilicifying calcium fluoride containing material and in particular fluorspar having a relatively high content of silicic acid.

The desilicification of fluorspar becomes important when types of this material of average to inferior quality are to be used for chemical purposes and in particular for the production of hydrogen fluoride from fluorspar and sulfuric acid. Only those types of fluorspar are suitable for the last mentioned chemical process, the silicic acid ($SiO_2$) content of which is maximally about 2%. A higher content of silicic acid causes the formation of silicon tetrafluoride and/or fluosilicic acid and thereby leads to such high losses of hydrogen fluoride that the entire process becomes uneconomical. Furthermore, if the fluorspar material contains silicic acids in relatively moderate amounts of about 20% $SiO_2$ by weight, the formation of hydrogen fluoride is completely suppressed in favor of an exclusive formation of fluosilicic acid as expresed by the chemical formula (1)   $3CaF_2 + SiO_2 + 3H_2SO_4 \rightarrow 3CaSO_4 + H_2SiF_6 + 2H_2O$ Fluorspar is a relatively common mineral; however, deposits of high quality spars substantially free from silicic acid are relatively rare. Usually, it is, therefore, necessary to enrich the mined fluorspar mineral mechanically by sorting, flotation, or separation by sedimentation.

It is also known to reduce the silicic acid content of fluorspar mineral material chemically by treating the spar with aqueous hydrofluoric acid. The aqueous fluosilicic acid solution formed by this treatment is to be separated from the desilicified spar by evaporation and hydrolysis at high temperature, whereby gaseous hydrogen fluoride is recovered. This hydrolytical cleavage of fluosilicic acid is greatly complicated, first by the required high temperatures in the order of 800° C., the decomposition of the aqueous solution into silicon tetrafluoride and hydrogen fluoride which are both volatilized, and the formation of very finely dispersed silicon dioxide formed by the hydrolysis of the gaseous silicon tetrafluoride with the concurrently evaporated water vapors. The finely distributed silicon dioxide is difficult to separate from the gaseous hydrogen fluoride which is highly diluted with the water vapors, and the separation requires voluminous installations and apparatus due to the high temperatures involved.

It is, therefore, an object of the present invention to provide a process for desilicifying fluorspar mineral materials in a simpler manner which involves only moderately increased temperatures and operational conditions whereby all of the reactants are substantially retained in the liquid phase, thus requiring much less voluminous apparatus than the known art.

The above-mentioned drawbacks are avoided and the object of the invention is achieved by our known process for desilicifying fluorspar mineral and similar calcium fluoride containing material having a relatively high content of silicic acid by the steps of (I) Digesting the starting material with a desilicifying salt or salts consisting of compounds of ammonium with fluorine, i.e. ammonium bifluoride or a mixture of ammonium bifluoride and neutral ammonium fluoride, preferably in aqueous solution, thereby forming ammonium fluosilicate through the reaction described by the equation (2)
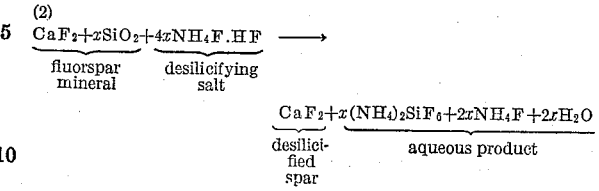

(II) Separating the resulting aqueous solution or mixture containing ammonium fluosilicate, ammonium fluoride and water from the desilicified spar.

According to a preferred mode of operation, the digestion is carried out at elevated temperature, for instance, between 50° C. and a temperature close to but still below the boiling point of the resulting aqueous salt mixture.

It is also preferred that the process according to our invention comprises the subsequent steps of (III) Causing ammonia to act on the ammonium fluosiliciate so as to decompose the same, and (IV) Filtering off the silicic acid which is much more easily separable than the finely divided slurry of silicon dioxide particles entrained in the gaseous phase of the known process mentioned above.

The resulting aqueous ammoniacal solution of ammonium fluoride is then (V) Concentrated in a known manner by heating at an atmospheric pressure to temperatures of about 150 to about 160° C. and gives off ammonia, thereby converting the ammonium fluoride in the solution increasingly to ammonium bifluoride as concentration progresses, while the escaping ammonia is recovered.

The resulting salt melt containing susbtantially ammonium bifluoride or preferably a mixture of ammonium bifluoride or neutral ammonium fluoride is then (VI) Re-introduced into the process and used for desilicifying further crude fluorspar.

Step (VII) consists in recirculating the ammonia recovered from step (V) into step (III).

The above described regeneration process can be carried out industrially in a simple manner and with only small losses so that practically the entire fluorine content of the crude fluorspar material can be utilized for the production of hydrogen fluoride.

Figure 2:
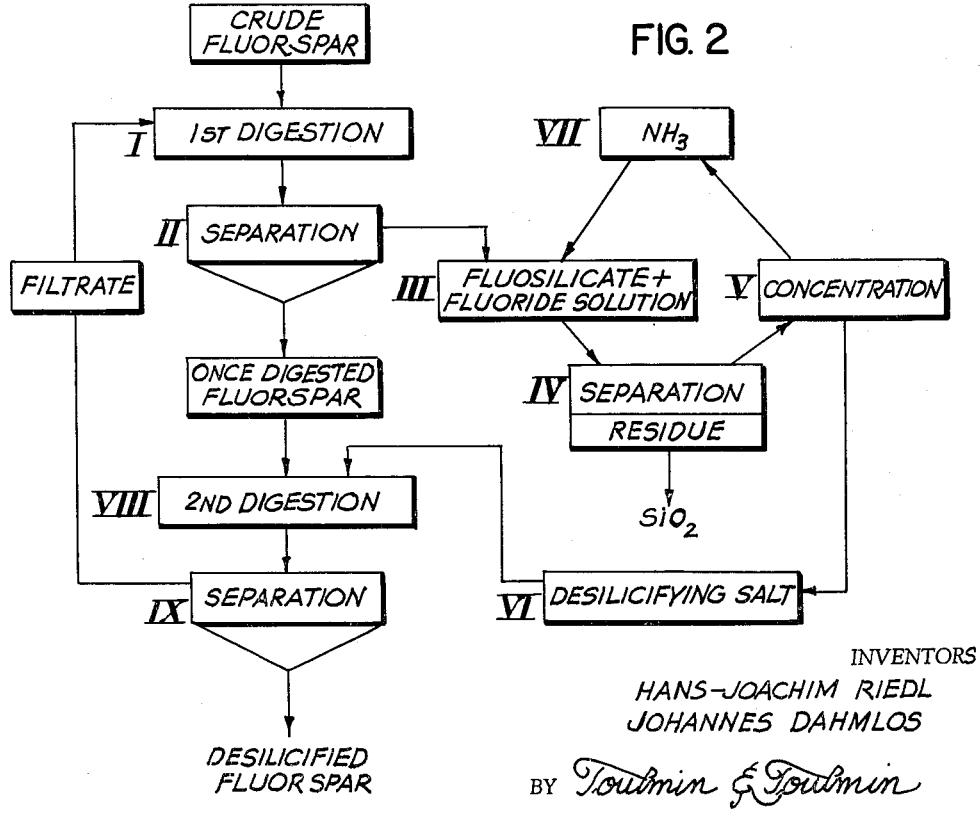

The process according to the invention is illustrated in the accompanying drawings in which:

FIGURE 1 illustrates a first mode of practising the invention involving a single digestion step, and FIGURE 2 illustrates another mode of the invention involving several digestion steps.

Steps (I) to (VII) illustrated in the drawings are those described hereinbefore.

The desilicification of the fluorspar containing material with the desilicifying agent consisting of ammonium bifluoride or preferably a mixture of the latter with neutral ammonium fluoride may be carried out by heating a mixture of the dry or substantially dry components. However, it is simpler and, therefore, preferable, to digest the finely ground spar with an aqueous solution of ammonium bifluoride or of a mixture of ammonium bifluoride and fluoride, while the reaction may be accelerated by simultaneous heating to above 50° C. and up to the boiling point of the solution. After this step (I) is terminated, the desilicified spar is separated by filtration from the solution and washed with water. After drying, a fluorspar containing less than 1% by weight of $SiO_2$ is obtained, which spar is excellently suited as starting material for the production of hydrogen fluoride.

The regeneration of the desilicifying agent from the aqueous product obtained by the reaction according to the Equation 2, i.e. from the solution containing ammonium fluosilicate and ammonium fluoride by the above-mentioned step (III) through the addition of ammonia takes place according to the equation (3) $(NH_4)_2SiF_6 + 4NH_3 + 2H_2O \rightarrow 6NH_4F + SiO_2$ whereby silicic acid is precipitated and a solution of ammonium fluoride is obtained. Ammonia may be introduced in an aqueous solution containing, for instance, 15% $NH_4OH$, or, preferably, gaseous ammonia is introduced into the solution under stirring. We prefer the use of ammonia in excess in order to favor a quantitative separation of the silicic acid. The reaction will then be exothermic and take place practically instantaneously, yielding a silicic acid in well filtrable form. Optimal precipitation conditions are obtained, if the reaction temperature is held in the vicinity of 40° C. which can be achieved by cooling or additional heating during the precipitation step. Optimal temperature range is 30° C. to 70° C. After the precipitated silicic acid has been filtered off and washed with water, the combined filtrate and wash water are concentrated in conventional thickeners, whereby first the excess of ammonia is driven off. With progressing concentration of the solution, the ammonium fluoride of the solution also sets free ammonia and is increasingly converted to ammonium bifluoride according to the equation (4) $2NH_4F \rightarrow NH_4F \cdot HF + NH_3$ According to step VII, the escaping gaseous ammonia is introduced either directly or in the form of an aqueous solution into step (III) of the process.

We have further discovered that contrary to expectation, a satisfactory and substantially complete desilicification of the fluorspar material does not require that the desilicifying agent consist substantially entirely of ammonium bifluoride. This discovery offers a great advantage in carrying out industrially the process according to the invention. For, in order to convert the salt melt, finally resulting from progressive concentration according to step (V into a melt consisting substantially entirely of ammonium bifluoride, it would be necessary to raise the temperature of the melt to at least 200° C. This might easily lead to losses of material through sublimation. Furthermore, the corrosive nature of the hot melt leads to a more or less disagreeable attack on the walls of the vessels and other parts of apparatus used, depending upon the material from which the same are made. We have found that particularly satisfactory results are obtained if the desilicifying agent consists of a mixture of ammonium bifluoride and neutral ammonium fluoride, which contains the necessary amount of ammonium bifluoride in the order of about 70 to 80%. Such a mixture constituting a fully satisfactory desilicifying agent is obtained by heating the salt melt produced during the concentration step (V) to about 160 to 170° C.

The described steps I through VII are preferably carried out in a continuous process, in particular step (V) comprising the concentration of the filtrate resulting from step (IV), and the production of the desilicifying salt agent is preferably carried out in a continuously operated column.

According to another mode of operation illustrated in FIGURE 2 in which like reference numerals indicate like steps as in FIGURE 1, the crude fluorspar material is subjected to two digestion steps, the second digestion step being designated by VIII. In this mode of operation, the crude material is first digested with a desilicifying agent which is constituted by the untreated filtrate obtained from separation step IX in which latter step the twice extracted fluorspar, the silicic acid content of which has been more strongly reduced than by a treatment according to FIGURE 1, is separated from the aqueous mixture or solution of ammonium fluosilicate and ammonium fluoride.

The concentrated, more strongly reactive desilicifying agent consisting of a salt melt obtained by step (V) is reintroduced according to step (VI) into the process by admixing it to the once digested fluorspar from separation step (II).

By the process shown in FIGURE 2, a fluorspar can be obtained, the $SiO_2$ content of which is reduced to about 0.5% by weight and less.

In a similar manner the digestion step may be repeated more than twice.

The invention is further illustrated by a number of examples which are, however, not intended to be limitative in any way or form.

*Example I*

A commercially available pulverized fluorspar having a $CaF_2$ content of 80.0% and a $SiO_2$ content of 12.9% by weight is to be desilicified according to mode A of the invention. Three kilograms (kg.) of this fluorspar are digested in a vessel of VA alloy steel under stirring with a solution of 3 kg. of desilicifying salt being a mixture of ammonium bifluoride and neutral ammonium fluoride having a content of about 80% of $NH_4HF_2$ in about 5 liters of water, during about 2½ hours at 70° C. The spar is then separated by filtration through a pressure filter and subsequently washed with one liter of hot water and dried. The silicic acid content of the spar has been reduced to about 1% $SiO_2$.

*Example II*

Example I is repeated; however, the filtered moist spar is subjected to a second digestion with a fresh solution of 3 kg. of the same salt mixture in 5 liters of water, whereupon the spar is again separated by filtration and washed. The entire second digestion step is carried out in the same manner as the digestion described in Example I. The twice extracted spar is washed several times with hot water under stirring in order to remove all adhering soluble matter. After drying, 2.56 kg. of a highly desilicified fluorspar are obtained, the $SiO_2$ content of which amounts to only 0.5%.

*Example III*

According to mode B of the process of the invention, 3 kg. of a starting material similar to that used in Example I are subjected to a first digestion by adding to the starting material in a vessel of VA steel, the filtrate obtained from the second digestion step of Example II.

The digested mixture which results from a treatment under the same conditions as described in Example I is subjected to a separation step by filtration, and the filtered, moist, once digested fluorspar is then subjected to a second digestion with 3.0 kg. of a desilicifying agent obtained from the filtrate resulting from the first digestion step according to Example II and processed as described in the subsequent Example IV.

In the same manner three further batches of 3 kg. each of the same starting material are twice extracted as described in this example and thus, from a total of 12 kg. of starting material, there are obtained 10.21 kg. of desilicified spar containing 92.7% by weight of $CaF_2$ and only 0.5% of $SiO_2$. The balance consists of $BaSo_4$, $Al_2O_3$ and $Fe_2O_3$ which do not disturb the production of hydrogen fluoride from this spar.

*Example IV*

In order to recover the desilicifying agent from the filtrate of the first digestion of Example II, or from each filtrate from the first digestion of each batch treated under Example III, the filtrate is treated in a vessel of VA steel by introducing an excess of gaseous ammonia under stirring. The ammonia is introduced at a flow rate of 5 liters per minute, and after a treatment of about 150 minutes approximately 0.5 kg. of $NH_3$ have been absorbed. A coolant is caused to pass through the necessary piping provided in and/or about the steel vessel, whereby the reaction temperature is held below 40° C. After the reaction is terminated, the precipitated silicic acid is separated by filtration and washed with hot water, whereupon the filtrate and wash water are combined and concentrated by evaporation in a closed column of VA steel. The driven off vapors are condensed in a cool upper portion of the apparatus and the ammonia is gathered in the form of an aqueous solution in a collector connected to the condensing part of the apparatus.

The concentration treatment is continued until the temperature in the residual salt melt has risen to between 160 and 170° C. The melt is then cooled and solidifies, and is then dissolved in 4 to 5 liters of water. This solution is then used for the second digestion step in which once extracted spar is treated as described in Example III.

The twice extracted spar obtained from the second digestion step is separated by filtration from the aqueous salt solution in which it is suspended, and the filtrate is used in the same manner as described in Example III as desilicifying agent in the first digestion of crude, untreated fluorspar material.

The total amount of silicic acid extracted in this manner from a total of 12 kg. of starting material is 1.50 kg. Since the original $SiO_2$ content of the starting material amounted to 1.55 kg., the amount of silicic acid retained in the twice extracted spar is 0.05 kg. which corresponds to less than 0.5% $SiO_2$.

The loss of desilicifying agent during a joint treatment as described in Examples III and IV amounts to about 5% of the initial quantity of salt mixture.

It will be understood that this invention is susceptible to modification in order to adapt it to different usages and conditions, and, accordingly, it is desired to comprehend such modifications within this invention as may fall within the scope of the appended claims.

What we claim is:
1. A process for desilicifying fluorspar having a relatively high content of silicic acid comprising the steps of digesting a $SiO_2$ containing fluorspar material with a desilicifying salt material selected from the group consisting of ammonium bifluoride and mixtures of ammonium bifluoride with ammonium fluoride so as to form ammonium fluosilicate, separating the desilicified fluorspar containing material from the latter, causing gaseous ammonia to act on the ammonium fluosilicate so as to decompose the same to form silicic acid, separating the latter from the resulting compounds of ammonium and fluorine, concentrating the compounds of ammonium with fluorine by heating to recover the said desilicifying salt and reintroducing the latter into the digestion step.

2. A process for desilicifying fluorspar having a relatively high content of silicic acid comprising the steps of digesting a $SiO_2$ containing fluorspar material in aqueous solution with a desilicifying salt material selected from the group consisting of ammonium bifluoride and mixtures of neutral ammonium fluoride and ammonium bifluoride, in such amounts as to convert the major portion of the $SiO_2$ content of the fluorspar material to ammonium fluosilicate, and to leave an $SiO_2$ content of maximally 2% by weight in the fluorspar material separating the undissolved desilicified fluorspar material from the solution containing the latter, introducing gaseous ammonia into the ammonium fluosilicate solution so as to decompose the latter to form silicic acid, separating the resulting precipitate of $SiO_2$ from the resulting solution containing compounds of ammonium and fluorine, concentrating the solution of compounds of ammonium with fluorine by heating to recover the said desilicifying salt and reintroducing the latter into the digestion step.

3. The process as described in claim 2, characterized in that the digestion of the $SiO_2$ containing fluorspar material with the desilicifying solution is carried out at moderately increased temperature.

4. A process for desilicifying fluorspar having a relatively high content of silicic acid, comprising the steps of digesting the $SiO_2$ containing fluorspar material with an aqueous solution of at least one desilicifying salt selected from the group consisting of ammonium bifluoride and mixtures of neutral ammonium fluoride and ammonium bifluoride so as to convert the major portion of the $SiO_2$ content of said fluorspar material to ammonium fluosilicate, and separating the desilicified fluorspar material from the resulting ammonium silicate solution.

5. The process as described in claim 1, characterized in that the step of concentrating the compounds of ammonium with fluorine resulting from the separation of silicic acid comprises heating the latter to about 160 to 170° C., so as to obtain a salt melt of ammonium bifluoride in mixture with neutral ammonium fluoride.

References Cited in the file of this patent
UNITED STATES PATENTS

| | | |
|---|---|---|
| 1,426,890 | McClenahan | Aug. 22, 1922 |
| 1,859,998 | Svendsen | May 24, 1932 |
| 2,780,522 | Gloss et al. | Feb. 5, 1957 |
| 2,780,524 | Gloss et al. | Feb. 5, 1957 |
| 2,816,818 | Gross | Dec. 17, 1957 |

OTHER REFERENCES

Mellor: "Comprehensive Treatise on Inorganic and Theoretical Chemistry," vol. 6, page 947 (1925), Longmans, Green & Co. (N.Y.).